Figure 1:
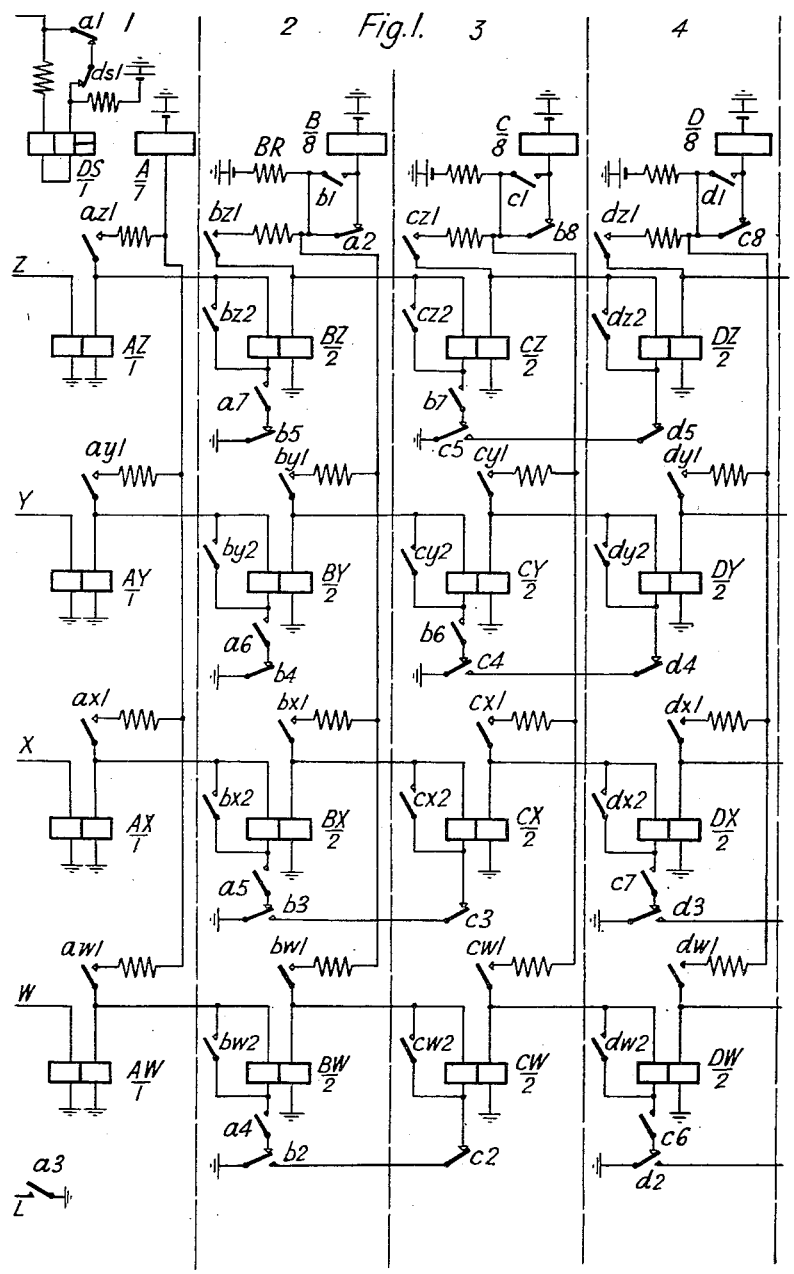

United States Patent Office 2,767,248
Patented Oct. 16, 1956

2,767,248

ELECTRICALLY OPERATED REGISTERS

Bloomfield James Warman, Blackheath, London, England, assignor to Siemens Brothers & Co. Limited, London, England, a British company Application May 19, 1953, Serial No. 356,053

Claims priority, application Great Britain June 27, 1952

9 Claims. (Cl. 179—18)

This invention relates to electrically operated registers for the registration and storage of items of information of a varying character until the time arrives for use to be made of them. Such registering arrangements may be used for forming the items of information into a queue and for the utilisation of or giving effect to the items in the order of their registration, or they may be used for the registration of digits from a digit transmitter in a telephone system for subsequent transmission in the order of receipt.

An example of a register according to the invention is a multi-digit register of the kind used in telephone systems. In a multi-digit register of this kind it is usual to assign individual registers to particular digits and in some cases when immediate use is to be made of the registered digits, an individual register may be assigned to two digits separated by as many digits as there are individual registers. The present invention is especially suitable to a system in which the number of the digits to be registered is variable as the individual registers are not assigned to any particular digit with the result that considerable simplification can be effected.

In the present invention the individual registers are connected in chain formation and the items of information to be registered are, in effect, queued up in the individual registers. An item to be registered enters the chain at one end, hereinafter referred to as the incoming end and passes along the chain towards the other end, hereinafter referred to as the outgoing end where it is stored in the vacant register nearest to the outgoing end and moves up the chain towards the outgoing end as the individual registers ahead of it become vacant, the item passing out of storage at the outgoing end for utilisation. The stored items are continually moving up the chain of individual registers towards the outgoing end as utilisation proceeds and the vacation of an individual register brings about its automatic restoration to the normal condition so that it can register the item moving up from the individual register behind it on the chain, or a new incoming item. In this way, when the last item of information has been utilised the whole of the registers will be in their normal condition. The items of information may be received and registered in code form.

It is a feature of the invention that when an item of information is transferred from one register to the next in order along the chain the register from which the item is transferred is only able to accept a transfer from the register next behind it when the whole of the information conveyed by the item stored in the middle register of the three referred to has been transferred and the register has assumed its normal condition. Also, that transfer of an item of information from a register can only take place when the whole of the information has been received by the register from the register next behind it and the register next ahead of it has been completely restored to its normal condition. A register is only restored to normal when the whole of the information stored in it has been transferred to the register next ahead and a signal to that effect has been received.

If immediate utilisation of stored items of information is to take place, as may occur in the case of a multi-digit register sender in a telephone system, it may not be necessary to provide as many individual registers as the maximum number of items for which registration is required if it can be ensured that the rate of reception of items in the incoming register is lower than the rate of utilisation.

Besides permitting the registration of a variable number of items of information the arrangements of the present invention have the advantage that no means for distributing the items in turn to the several registers and for arranging for their utilisation in the order of registration are required.

For the registration of items in code form an individual register may comprise a number of register relays connected to different incoming wires and operable singly or in combination in accordance with the code marking of the incoming wires. In the case of digit registration where the decimal system is used an individual register may comprise four register relays, each connected to a different one of four incoming wires, and a control relay.

The invention finds an especial use in a telephone system in which numbers are set up by an operator by means of a key strip. In such use the keys would mark the wires incoming to the register, and impulse sending and counting arrangements would be associated with the individual register at the outgoing end of the chain. In order to ensure that transfer from one register to the next is effected without delay and to guard against irregular operation of the incoming register should a digit key remain depressed after the digit that it represents has been registered on an individual register, arrangements would be made to prevent repeated rgistration of any digit due to this cause. Such arrangements may take the form of a holding element operated when a digit is registered on the initial individual register at the incoming end of the chain and held operated so long as the key representing this digit remains depressed, the holding element disconnecting the individual register from the incoming wires or otherwise preventing re-operation or holding of the register.

The invention will be made clear from a consideration of the following description taken in conjunction with the accompanying drawings.

Figure 2:
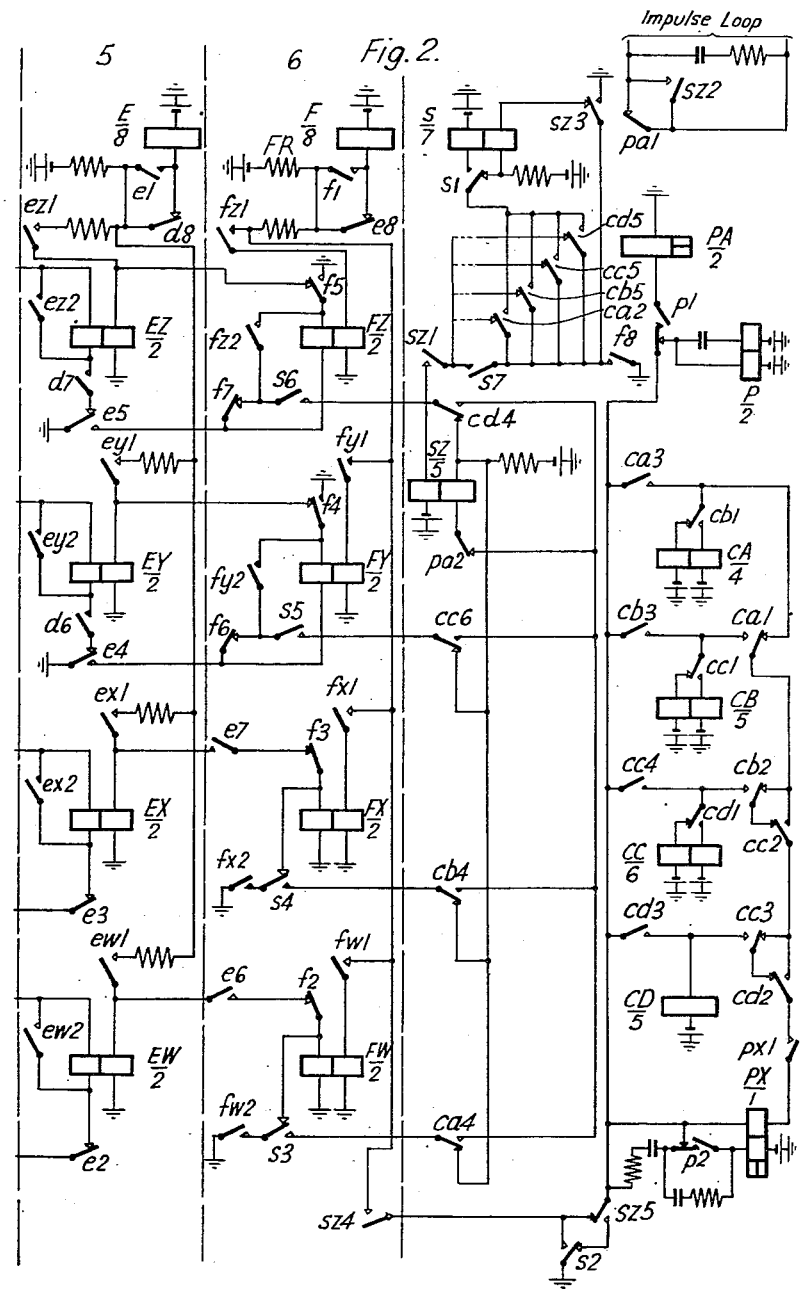
Figure 3:
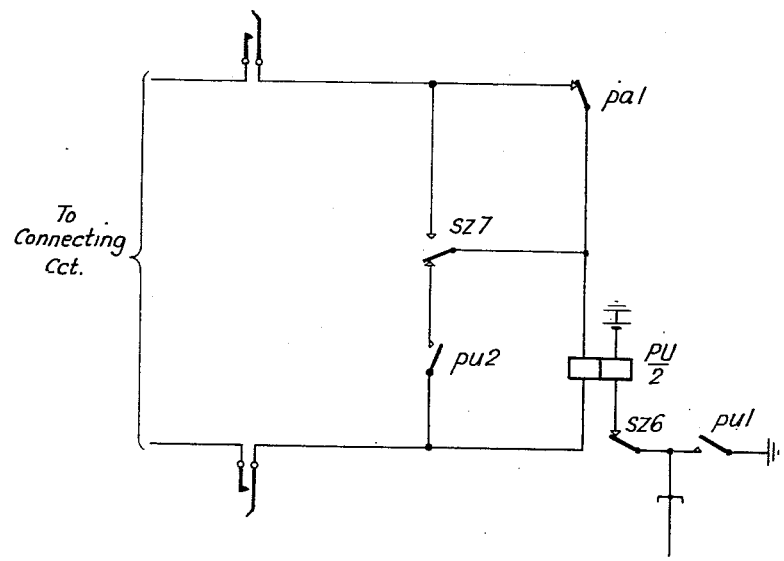

The drawings show by way of example the circuits of a register sender embodying the invention. Figs. 1 and 2 show the circuits of the register sender and Fig. 3 shows a modification to the outgoing impulsing loop.

The register sender is of the relay type and in the example consists of six relay-type individual registers for digit storage, and impulse sending and counting means. The individual registers are arranged to store digits in code form, the code being the application of battery to one or a combination of four wires designated W, X, Y, Z at the left hand side of Fig. 1. Each register includes four register or storage relays and a control relay. For convenience, the registers will be referred to by numbers, register 1 being that shown at the left hand of Fig. 1 and register 6 being that shown at the right hand of Fig. 2. In register 1 the control relay is designated A and the storage relays AW, AX, AY and AZ, the relays AW—AZ being connected respectively to wires W—Z for receipt of the several elements of the code. In register 2 the control relay is designated B and the storage relays BW—BZ, and so on to register 6 in which the control relay is designated F and the storage relays FW—FZ. Besides the relays referred to as being included in register 1 there is associated with this register a high speed guard relay DS. The impulse sending and counting means include the relay-type impulse generator P, high speed relays PA and PX, four counting relays CA, CB, CC, CD, the start relay S and stop relay SZ.

The storage relays are two-winding relays and their operating windings are earthed, the relays of register 1 being operable by the extension of battery connected to all the keys of a strip of digit keys over an operated key to one or more of the wires W—Z in known manner, the battery connection including break contacts 1 of relays DS and A. The storage relays of subsequent registers are operated in parallel with the holding windings of the corresponding relays operated in the register next behind it after the operation of the control relay of the said latter register. The control relay of register 1 is operated in series with the holding windings of the operated storage relays of that register and in the other registers the control relay is similarly operated but the operating circuit is not closed until the control relay of the register next behind it has been released. An outline of the arrangements having been given, a detailed description of the circuit operations that take place in registering and sending out registered digits follows.

It will be assumed that the register sender is in its normal condition and has become connected to the digit key strip and that a digit key has been depressed. According to the key depressed, battery over contacts $ds1$ and $a1$ and the closed key contacts will be connected to one or more of the wires W, X, Y, Z and the relevant storage relays in register 1 will be operated. As all the storage relays operate in a similar manner and effect similar circuit changes it is thought that reference to the operations responsive to battery connection to only one wire will be sufficient to explain the operations of the registers. Accordingly, it will be assumed that battery is connected by a depressed key to wire Z only and that relay AZ will thereupon be operated over its left hand winding. At contact $az1$, relay A is connected in series with the right hand winding of relay AZ and is operated. Contact $a1$ opens and removes a short circuit from relay DS which thereupon operates and remains operated so long as the key remains depressed, contact $ds1$ guarding the relay against short circuit should relay A release before the key contacts open. Contact $a2$ opens in the operating circuit for relay B, contact $a3$ closes a circuit over wire L to a lamp to indicate that register 1 is occupied and contacts $a4$, $a5$, $a6$ and $a7$ connect earth to the operating (left hand) windings of the storage relays of register 2. As it has been assumed that only wire Z has been marked, attention, as regards this digit, need only be given to the storage relays bearing the final designating letter Z. Accordingly, on the closure of contact $a7$, earth over contact $b5$ is connected to the operating winding of relay BZ and that relay operates in parallel with the holding winding of relay AZ. At contact $bz1$ the right hand (holding) winding of relay BZ is connected to battery over resistance BR and is energised and at contact $bz2$ the operating winding of relay BZ and the holding winding of relay AZ are short circuited. Relay AZ will release and at contact $az1$ release relay A. Relay DS will also have released, unless the key has been held down, so that with contacts $a1$ and $ds1$ closed battery will again become connected to the digit keys. Contact $a2$ closes the operating circuit for relay B in parallel with resistance BR, contact $a3$ extinguishes the "register occupied" lamp and contacts $a4$ to $a7$ disconnect the operating windings of the storage relays of register 2. Register 1 will now be back in its normal condition. The digit keyed will now be seen to have been initially registered in register 1 and passed on to register 2, and register 1 released for registration of the next digit. Consequent on the operation of relay B, the relay locks up over contact $b1$ independently of contact $a2$ and at contacts $b2$—$b5$ disconnects earth from the operating windings of relays BW—BZ and at contacts $b2$, $b3$, $b6$ and $b7$ connects earth to the operating windings of relays CW—CZ for the transfer of the digit to register 3 by the operation of relay CZ in parallel with relay BZ. In the same manner as that described in connection with the operation of relay BZ, relay C is operated and relay BZ is released followed by the release of relay B and the digit is now stored in register 3 and register 2 assumes its normal condition. Transfer to registers 4, 5 and 6 take place in similar manner. When relay E is operated the left hand winding of relay FZ is connected over contacts $e5$ and $f5$ in parallel with the right hand winding of relay EZ and relay FZ is operated and locks up over its right hand winding, contact $fz1$ and resistance FR. Contact $fz2$ short circuits relay EZ to release it, whereupon relay E releases and closes the operating circuit for relay F at contact $e8$. Relay F operates in parallel with resistance FR and locks up over contact $f1$. Contacts $f2$—$f5$ disconnect the operating windings of the storage relays of register 6 from their operating circuits, contacts $f6$ and $f7$ open to guard against irregular operation of the stop relay SZ and contact $f8$ operates relay S over its right hand winding and contact $sz3$. Whilst the digit considered has been registered and transferred successively from register 1 to register 6 other digits may have become registered and transferred in a similar manner. A second digit will therefore be registered initially on register 1 and transferred along the chain to register 5. In register 5 one or more of the relays EW—EZ will be operated followed by operation of relay E. As the operating windings of relays FW—FZ will be disconnected at this time at contacts $f2$—$f5$ the digit will remain stored in register 5 until such time as register 6 becomes free whereupon it will become transferred to register 6 in the manner already described. In a similar manner four other digits may be registered and stored in registers 4, 3, 2 and 1 and when the sixth digit is registered and all the preceding five digits still remain registered and stored, closure of contact $a3$ will light the "register occupied" lamp.

Following on the operation of relay S, contact $s1$ prepares a holding circuit for the relay, contact $s2$ connects earth over contacts $sz5$ and $p1$ to the impulse generator P which operates in known manner to interrupt its own circuit and transmit pulses to relay PA at contact $p1$. Contact $p2$ in its make-through position operates high speed relay PX from the earth over contacts $s2$ and $sz5$, and contact $px1$ on closure connects earth over contacts $s2$, $sz5$, winding of relay PX, contacts $cd2$, $cc3$, $cc2$, $cb2$, $ca1$ and $cb1$ to the left hand winding of the first counting relay CA. Meanwhile contact $pa2$ has disconnected the operating circuit of relay SZ while a pulse is transmitted over an outgoing loop at contact $pa1$. Relays CA—CD operate in known manner to count up to 10 impulses. If the marking of wire Z alone is the code for four impulses, four impulses will be counted off by the counting relays. When the fourth impulse has been counted, relay CD will be operated and relays CA, CB and CC will have been released. In this condition contact $cd4$ will be closed and on the release of relay PA after the transmission of the fourth pulse over the outgoing loop relay SZ will be operated in the following circuit: earth over contacts $f5$, $fz2$, $s6$, $cd4$, $pa2$, right hand winding of relay SZ, resistance to battery. As relays CA—CC and FW—FY will be unoperated no earth will be present to short circuit the operating winding of relay SZ to prevent it from operating. It may here be explained that if the keyed digit represented the code for five impulses and wires W and Z were marked relay SZ would be short circuited over contacts $f5$, $fz2$, $s6$, and $cd4$ when the first impulse had been transmitted and over contacts $fw2$, $s3$ and $ca4$ when the fourth impulse had been transmitted. With the transmission of the fifth impulse, these short circuits will be removed by the operation of relays CA and CD, and relays CB, CC, FX and F7 being unoperated no other short circuits will exist to prevent relay SZ operating. When relay SZ operates it holds over its left hand windings and contacts $sz1$, $s7$ and $f8$, at contact $sz2$ it bridges the outgoing loop to prevent further operation of relay PA being effective in transmitting impulses, at contact $sz3$ it maintains the holding circuit for itself against the release of relay F, at contact $sz4$ it holds relay F and releases relay FZ by short circuit and at contact $sz5$ it releases the operated counting relay CD which locked up over contacts $cd3$, $sz5$ and $s2$. Release of relay CD releases relay S which has been held over its left hand winding during impulse transmission and contacts $s3$—$s6$ open in the operating circuits for relay SZ. Contact $s2$ falling back re-starts the pulse generating and counting relays to measure off an inter-train pause and releases relay F. For pause counting purposes one or more of the contacts $ca2$, $cb5$, $cc5$ and $cd5$ will be strapped to contact $sz1$ so that relay SZ will be held over one or more of these contacts and contact $sz3$ until the requisite pause has been measured off whereupon the holding circuit will be opened and relay SZ released. The arrangement operates in a similar manner to the counting off of impulses. Counting arrangements of this kind are described in United Kingdom Specification No. 573,885 granted to Siemens Brothers & Co. Limited and Douglas Percy Long and dated December 24, 1943. When relay SZ releases the operated counting relays are released and the circuit of the pulse generator is opened at contact $sz5$ and at contact $sz2$ the bridge across the outgoing loop is removed but the loop remains closed over contact $pa1$ due to the release of relay PA. When relay F releases, the operating windings of the storage relays in register 6 are connected in parallel with those of register 5 and on their operation the operated relays of the set EW—EZ are released followed by the release of relay E. Relay F thereupon re-operates and the digit stored in register 5 has now been completely transferred to register 6. Similarly, the digits stored in the earlier numbered registers are transferred to the next higher numbered register and register 1 again becomes unoccupied and with the release of relay A the "register occupied" lamp is extinguished. It will thus be seen that as soon as the digit stored in register 6 has been transmitted and that register has become free a free register will be made available, if not already unoccupied, earlier in the chain of registers so that, if the stored digits are transmitted and register 6 repeatedly freed with sufficient rapidity there is theoretically no limit to the number of digits that may be registered in the chain of registers. It will be noted that as impulse trains are transmitted, stored digits are continually moving along the chain towards the highest numbered register and the lower numbered registers become vacated, the transfer of a digit from one register to the next automatically rendering that one register vacant, so that when the last digit stored has been transmitted the whole register will be vacant and in its nomal condition. No special arrangements are therefore necessary to determine when the last digit has been transmitted so that the register may be used for a variable number of digits without difficulty.

When any of the relays BW—BZ operates relay A would, in the absence of relay DS, reelase when the digit key is released and so permit operation of relay B but transfer of the digit registered in register 1 would be delayed until the digit key is actually released. If the interval between release of a digit key and depression of a key for transmission of the next digit is very short, relay A might not be released long enough to allow relay B to operate. By the inclusion of relay DS and the series resistance it is ensured that relay A will be released immediately a register relay of register 2 has operated and closed its contacts 2. In order to prevent a second registration of the same digit in register 1, relay DS, which remains operated so long as a digit key is depressed, holds open the operating circuit for the register relays of register 1 at contact $ds1$ and inserts a high resistance in the operating circuit for the register relays which prevents any of those relays being or remaining operated so long as a key is depressed. Operation of relay A removes a short circuit about relay DS at contact $a1$ and relay DS operates in a circuit over the closed key contacts and operating windings of the register relays of register 1. The removal of the short circuit at contact $a1$ inserts a high resistance in the operating circuit of the register relays and the operation of relay DS holds open this short circuit at contact $ds1$ so long as the digit key remains depressed.

A modification is shown in Fig. 3 to permit restoration of the register sender if it is desired to make a rapid cancellation of a partially set up connection. In the modification the outgoing impulsing loop shown in Fig. 2 is provided with a relay PU which is operated when the loop is connected to battery and earth feed in a cord or connecting circuit at a position. This connection may include make contacts of a dialling key and relay PU is arranged to be maintained operated whenever these contacts are closed. The earth for the relays in the register, which, in the example would be individual to a position, is connected over make contact $pu1$ when relay PU is operated. Contact $pu2$ is a late closing contact which short circuits the operating winding of relay PU to maintain a low-impedance impulsing loop. Relay PU is operated by throwing the dial key thereby connecting the left hand winding of the relay to battery and earth and the relay locks up over contacts $sz6$ and $pu1$ and contact $pu1$ connects the earth to the relays in the registers. When relay SZ is operated after the last impulse of an impulse train has been transmitted, the holding winding of relay PU is disconnected at contact $sz6$ but the relay is held operated over contact $sz7$ during the inter-train pause. When this ceases contacts $sz6$ and $sz7$ fall back and relay PU remains held. It is released by the restoration of the dial key or withdrawal of the plug of the cord circuit or restoration of the connecting key and on release it releases all the relays in the register which is thereupon restored to normal. If the plug of the cord circuit is withdrawn or the connecting key is restored not only will the register sender be released but the set up connection will also be released.

What is claimed is:

1. A multi-digit register sender of the kind used in telephone systems comprising an assembly of registers all connected in chain formation there being an incoming register at one end of the chain connected to wires over which digits are transmitted in code form for registration in said register, intermediate registers and an outgoing register connected to an impulse sending and counting device, means responsive to the registration in said incoming register to transfer the registration to the adjacent intermediate register if it is free and like means in each of the intermediate registers responsive to registration therein of transferred coded digits to transfer the registration to the next register along the chain until the registration becomes registered in the outgoing register and like means in the outgoing register initiating the sending of impulses in accordance with the registration in the outgoing register, and means in the sending and counting device operated by the completion of sending of said registrations to restore the outgoing register to normal whereupon said first mentioned means become operative to transfer all the coded elements of a digit from the relevant register next behind it on the chain to that register.

2. A multi-digit register sender according to claim 1 including a relay in the sending device operated on the registration of a digit in the outgoing register to initiate sending of impulses corresponding to said registered digit and a relay in the counting device operated when all the said impulses have been sent, operation of said latter relay bringing about release of said former relay which re-starts the sending device to measure off a prescribed period at the end of which said latter relay is released, release of said latter relay restoring the outgoing register to normal.

3. A multi-digit register sender according to claim 1 in which means operated by current flow over said wires to the incoming register prevents re-operation of storage relays from which the coded elements have been transferred until such current flow ceases.

4. A multi-digit register sender according to claim 1 in which a relay is operated in series with the storage relays of the incoming register to insert a resistance in the operating circuit over said wires for storage relays of the incoming register that is too high to permit re-operation of a storage relay from which the coded elements have been transferred.

5. A multi-digit register sender according to claim 1 in which the impulses sent by the impulse sending device are sent by the opening and closing of a loop and in which the impulse sender includes a relay operable by current flow over the loop to connect potential to all the registers for their operation.

6. A multi-digit register sender according to claim 1 in which the impulses sent by the impulse sending device are sent by the opening and closing of a loop including contacts of a dialling key, a relay in the impulse sending device operable by current flow over the loop on closure of said contacts to connect potential to all the registers for their operation.

7. An electrically-operated register assembly for the registration and storage of items of information of a variable character for subsequent utilisation, comprising a plurality of incoming wires over which items of information for registration and subsequent utilisation are received, an incoming register connected to said wires and adapted to register items of information received over these wires, intermediate registers, an outgoing register, a utilisation circuit connected to said outgoing register, all of said registers being connected in chain formation, a storage device in each of said incoming, intermediate, and outgoing registers for each of said wires, each said storage device being capable of registering and storing an element of information, a control device in said incoming register common to all said storage devices in this register and operable when and so long as an element of information is stored in any said storage device in this register, a control device in each of said intermediate and outgoing registers common to all said storage devices in the corresponding register and operable when and so long as an element of information is stored in any said storage device in the corresponding register and said control device in the register next behind (in the chain) the corresponding register is at normal, means for each of said incoming and intermediate registers including said control device in the corresponding register and operative on an item of information being stored in the corresponding register to initiate transfer of each element of information stored in the corresponding register to the next register along the chain if this next register is free, to progress the registration of an item of information from said incoming register through all of said intermediate registers in turn to said outgoing register, and means for each of said intermediate and outgoing registers including said storage devices in the corresponding register and operative on an item of information being registered in the corresponding register to restore to normal the register from which this item of information has been transferred.

8. An electrically-operated register assembly for the registration and storage of items of information of a variable character for subsequent utilisation, comprising a plurality of incoming wires over which items of information for registration and subsequent utilisation are received as signals in multi-element code form, there being one such wire for each element of the code, an incoming register connected to said wires and adapted to register items of information received over these wires, intermediate registers, an outgoing register, a utilisation circuit connected to said outgoing register, all of said registers being connected in chain formation, a storage device in each of said incoming, intermediate, and outgoing registers for each element of the multi-element code, a control device in said incoming register common to all said storage devices in this register and operable when and so long as an element of a code signal is stored in any said storage device in this register, a control device in each of said intermediate and outgoing registers common to all said storage devices in the corresponding register and operable when and so long as an element of a code signal is stored in any said storage device in the corresponding register and said control device in the register next behind (in the chain) the corresponding register is at normal, first transfer-controlling means for each of said incoming and intermediate registers including said control device in the corresponding register and operative on an item of information being stored in the corresponding register to initiate transfer of each code signal element stored in the corresponding register to the next register along the chain if this next register is free, to progress the registration of an item of information from said incoming register through all of said intermediate registers in turn to said outgoing register, and second transfer-controlling means for each of said intermediate and outgoing registers including said storage devices in the corresponding register and operative on an item of information being registered in the corresponding register to restore to normal the register from which this item of information has been transferred.

9. A register assembly according to claim 7, in which said storage devices are relays and the operation of any said relay in any said intermediate or outgoing register short-circuits the corresponding relay in the register next behind this register.

References Cited in the file of this patent

UNITED STATES PATENTS

| 2,283,395 | Strickler | May 10, 1942 |
| 2,614,169 | Cohen et al. | Oct. 14, 1952 |
| 2,638,506 | Bray | May 12, 1953 |
| 2,700,148 | McGuigan et al. | Jan. 18, 1955 |